US011297591B1

(12) United States Patent
El Ferkouss et al.

(10) Patent No.: US 11,297,591 B1
(45) Date of Patent: Apr. 5, 2022

(54) HANDLING MULTIPLE FINE TIMING MEASUREMENT RANGING REQUESTS

(71) Applicant: Hewlett Packard Enterprise Development LP, Houston, TX (US)

(72) Inventors: Omar El Ferkouss, St. Laurent (CA); Andre Beaudin, St. Laurent (CA)

(73) Assignee: Hewlett Packard Enterprise Development LP, Houston, TX (US)

( * ) Notice: Subject to any disclaimer, the term of this patent is extended or adjusted under 35 U.S.C. 154(b) by 2 days.

(21) Appl. No.: 17/060,155

(22) Filed: Oct. 1, 2020

(51) Int. Cl.
*H04W 64/00* (2009.01)
*H04W 88/08* (2009.01)

(52) U.S. Cl.
CPC ............ *H04W 64/00* (2013.01); *H04W 88/08* (2013.01)

(58) Field of Classification Search
CPC . H04W 64/00; H04W 88/08; H04W 72/1247; H04W 72/1278; H04W 72/121; H04W 24/10; H04W 84/12; H04W 72/044; H04W 72/0446
See application file for complete search history.

(56) References Cited

U.S. PATENT DOCUMENTS

| | | | |
|---|---|---|---|
| 9,585,080 B2 | 2/2017 | Hareuveni et al. | |
| 9,935,756 B2 | 4/2018 | Sridhar et al. | |
| 9,999,010 B2 | 6/2018 | Segev | |
| 10,172,025 B2 | 1/2019 | Vamaraju et al. | |
| 10,681,578 B2 | 6/2020 | Chu et al. | |
| 10,681,579 B2 | 6/2020 | Yang | |
| 2016/0345277 A1* | 11/2016 | Segev | H04L 1/16 |
| 2017/0118772 A1* | 4/2017 | Abinader, Jr | H04W 74/002 |

OTHER PUBLICATIONS

Horn, B.K.P., WiFi Fine Time Measurement (FTM) Round Trip Time (RTT) for indoor positioning, (Web Page), Retrieved Aug. 25, 2020, 3 Pgs.
Ibrahim, M. et al., Verification: Accuracy Evaluation of WiFi Fine Time Measurements on an Open Platform, (Research Paper), MobiCom '18: Proceedings of the 24th Annual International Conference on Mobile Computing and Networking, Oct. 2018, pp. 417-427.

* cited by examiner

*Primary Examiner* — Srilakshmi K Kumar
*Assistant Examiner* — Umair Ahsan
(74) *Attorney, Agent, or Firm* — Hewlett Packard Enterprise Patent Department

(57) ABSTRACT

Examples of techniques for handling multiple fine time measurement ranging requests are described. In an example, an access point (AP) may receive a ranging request for initiating an FTM session from each client device in a set of client devices. Based on the ranging request, a plurality of burst durations, each for performing the FTM session for each client device is determined. A maximum burst duration may be determined form the plurality. If a service time for serving high priority traffic is less than the maximum burst duration, a subset of the client devices is selected for performing the FTM session, where a sum of burst durations for performing the FTM session for each client device in the subset is less than the maximum burst duration. The FTM session for each client device in the subset is initiated.

20 Claims, 5 Drawing Sheets

HANDLING MULTIPLE FINE TIMING MEASUREMENT RANGING REQUESTS

BACKGROUND

A computer network includes a variety of network devices, such as access points, controllers, gateways, switches, etc., which perform different networking operations, such as network access, authentication, and routing network traffic to provide connectivity. A Wireless Local Area Network (WLAN) may include a plurality of Access Points (APs), as elements of the WLAN. These APs may be deployed in a network.

Client devices, such as laptops, personal computers, smartphones, etc. connect to network devices to exchange data with the network. Various positioning techniques can be employed for determining the position of a wireless communication device (e.g., a wireless local area network (WLAN) device) based on receiving wireless communication signals. For example, positioning techniques can utilize one or more Fine Timing Measurement (FTM) sessions between a client device and one or more access points. The positioning techniques may utilize one or more message exchanges to determine time of arrival (TOA), the round trip time (RTT), or the time difference of arrival (TDOA) of the wireless communication signals. The RTT, TOA, and TDOA information may be used to determine the position of a wireless communication device in a wireless communication network. These factors may be used in conjunction with the known positions of one or more stations in the wireless network to derive the location of the wireless communication device. The client devices and network devices may interact using different protocols and standards. The Institute of Electrical and Electronics Engineers (IEEE) publish many specifications for use in wireless communications under the 802.11 standard family. 802.11 continues to evolve in an attempt to address all challenges presented with proliferation of wireless devices.

BRIEF DESCRIPTION OF DRAWINGS

The present disclosure, in accordance with one or more various embodiments, is described in detail with reference to the following figures. The figures are provided for purposes of illustration only and merely depict typical or example embodiments.

Figure 1:
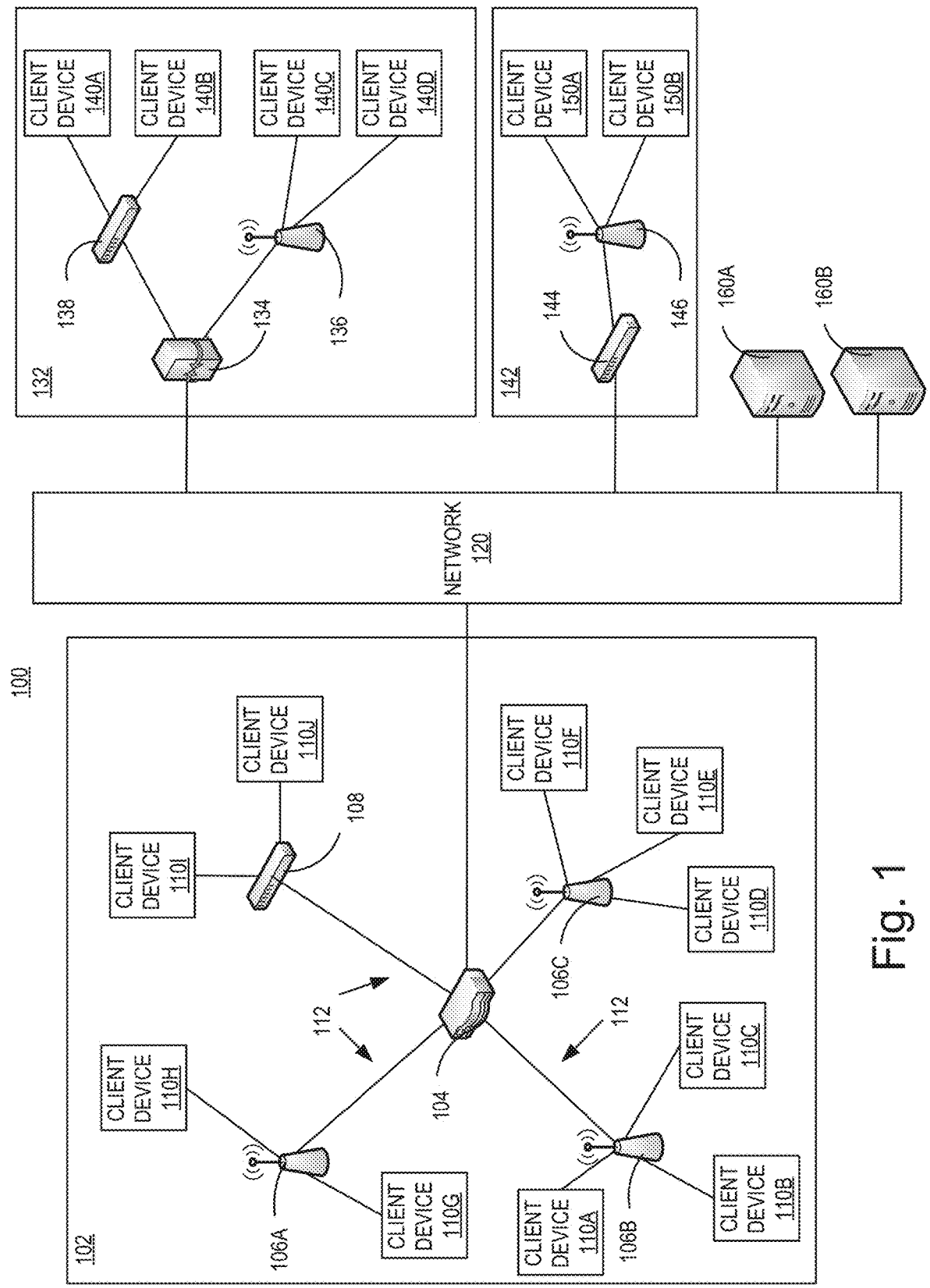
FIG. 1 illustrates an example of a network configuration that may be implemented for an organization, such as a business, educational institution, governmental entity, healthcare facility or other organization.

The figures are not exhaustive and do not limit the present disclosure to the precise form disclosed.

DETAILED DESCRIPTION

Fine Timing Measurement (FTM) may be used by wireless communication devices, such as wireless access points (AP) or client devices, to estimate the distance between them. Generally, schemes for FTM enable an AP to handle an FTM request from a single client device, such as a computer or a smartphone, at a given time. However; in some instances; an AP may receive requests to initiate an FTM session from multiple client devices at a given time. For instance, if the AP is serving high priority traffic, such as voice/video or VoIP traffic, and receives multiple requests to initiate FTM in parallel, the AP may not be able to respond to the requests while serving the traffic. In an instance, the AP may arbitrarily accept one or more requests, which may impact the APs performance in serving the high priority traffic, resulting in performance degradation, packet drops; etc. Thus, multiple FTM requests at a given time may result in a lower performance and degraded quality of data transmission of the AP.

The present disclosure relates to techniques of handling multiple requests for initiating FTM, without affecting high priority traffic served by the AR According to the present disclosure, a ranging request for initiating an FTM session is received by an AP from each client device in a set of client devices. The ranging request refers to a request to initiate the FTM session to determine the distance between the requesting device and the AR The set of client devices may include electronic devices, such as laptops or smartphones. Based on the ranging request, the AP may determine a plurality of burst durations, where each burst duration from the plurality is indicative of a time period for performing the FTM session for each client device in the set. The FTM session generally occurs as burst transmissions. Burst transmission is the broadcast of a relatively high-bandwidth transmission over a short period. Burst transmission includes intermittent asynchronous transmission of a specific amount of data. The burst transmission can be intermittent at a regular or an irregular rate. The time duration for executing one FTM session is referred to as the burst duration. There may be one or more FTM-based messages exchanged between two WiFi stations in the burst duration. The AP determines a maximum burst duration from the plurality of burst durations. Further, it is checked whether the AP is serving high priority traffic. In an example, high priority traffic may be classified based on a differentiated services code point (DSCP) present in an Internet Protocol (IP) packet header. In another example, the high priority traffic may be sensitive traffic which the operator has an expectation to deliver on time. This may include Voice over Internet Protocol (VoIP), media streaming services, online gaming, video conferencing, and web browsing. Traffic management schemes may be configured in such a way that the quality of service of these selected uses is guaranteed, or at least prioritized over other classes of traffic. Responsive to determining that the AP is serving high priority traffic, a service time for serving the high priority traffic is compared with the maximum burst duration. The service time refers to an estimated time that the AP may take to serve the high priority traffic. The service time may be estimated based on a number of factors including source, destination, data rate, amount of data to be transferred, etc. If the service time is less than the maximum burst duration, a subset of the client devices for each of which the AP is to perform the FTM session is selected, such that a sum of burst durations for performing the FTM session for each client device in the subset is less than the maximum burst duration. The AP initiates the FTM session for each client device in the selected subset.

Thus, in the present disclosure, FTM sessions for selected requesting client devices may be initiated based on a comparison of the service time of the high priority traffic being served and the maximum burst duration. Also, FTM sessions are initiated for the selected client devices, if the sum of the burst durations for the FTM sessions do not exceed the maximum burst duration. If, the service time of the high priority traffic is more than the maximum burst duration, the ranging requests are rejected. Thus, using the techniques of the present disclosure, the AP can selectively process FTM ranging requests from multiple client devices while serving high priority traffic without performance degradation.

The following detailed description refers to the accompanying drawings. Wherever possible, the same reference numbers are used in the drawings and the following description to refer to the same or similar parts. While several examples are described in the description, modifications, adaptations, and other implementations are possible. Accordingly, the following detailed description does not limit the disclosed examples. Instead, the proper scope of the disclosed examples may be defined by the appended claims.

Before describing embodiments of the disclosed systems and methods in detail, it is useful to describe an example network installation with which these systems and methods might be implemented in various applications. FIG. 1 illustrates one example of a network configuration 100 that may be implemented for an organization, such as a business, educational institution, governmental entity, healthcare facility or other organization. This diagram illustrates an example of a configuration implemented with an organization having multiple users (or at least multiple client devices 110) and possibly multiple physical or geographical sites 102, 132, 142. The network configuration 100 may include a primary site 102 in communication with a network 120. The network configuration 100 may also include one or more remote sites 132, 142, that are in communication with the network 120.

The primary site 102 may include a primary network, which can be, for example, an office network, home network or other network installation. The primary site 102 network may be a private network, such as a network that may include security and access controls to restrict access to authorized users of the private network. Authorized users may include, for example, employees of a company at primary site 102, residents of a house, customers at a business, and so on.

In the illustrated example, the primary site 102 includes a controller 104 in communication with the network 120. The controller 104 may provide communication with the network 120 for the primary site 102, though it may not be the only point of communication with the network 120 for the primary site 102. A single controller 104 is illustrated, though the primary site may include multiple controllers and/or multiple communication points with network 120. In some embodiments, the controller 104 communicates with the network 120 through a router (not illustrated). In other embodiments, the controller 104 provides router functionality to the devices in the primary site 102.

The controller 104 may be operable to configure and manage network devices, such as at the primary site 102, and may also manage network devices at the remote sites 132, 134. The controller 104 may be operable to configure and/or manage switches, routers, access points, and/or client devices connected to a network. The controller 104 may itself be, or provide the functionality of, an access point.

The controller 104 may be in communication with one or more switches 108 and/or wireless Access Points (APs) 106a-c. Switches 108 and wireless APs 106a-c provide network connectivity to various client devices 110a-j. Using a connection to a switch 108 or AP 106a-c, a client device 110a-j may access network resources, including other devices on the (primary site 102) network and the network 120.

Examples of client devices may include: desktop computers, laptop computers, servers, web servers, authentication servers, authentication-authorization-accounting (AAA) servers, Domain Name System (DNS) servers, Dynamic Host Configuration Protocol (DHCP) servers, Internet Protocol (IP) servers, Virtual Private Network (VPN) servers, network policy servers, mainframes, tablet computers, e-readers, netbook computers, televisions and similar monitors (e.g., smart TVs), content receivers, set-top boxes, personal digital assistants (PDAs), mobile phones, smart phones, smart terminals, dumb terminals, virtual terminals, video game consoles, virtual assistants, Internet of Things (IOT) devices, and the like. Client devices may also be referred to as stations (STA).

Within the primary site 102, a switch 108 is included as one example of a point of access to the network established in primary site 102 for wired client devices 110i-j. Client devices 110i-j may connect to the switch 108 and through the switch 108, may be able to access other devices within the network configuration 100. The client devices 110i-j may also be able to access the network 120, through the switch 108. The client devices 110i-j may communicate with the switch 108 over a wired 112 connection. In the illustrated example, the switch 108 communicates with the controller 104 over a wired 112 connection, though this connection may also be wireless.

Wireless APs 106a-c are included as another example of a point of access to the network established in primary site 102 for client devices 110a-h. The APs 106a-c may control network access of the client devices 110a-h and may authenticate the client devices 110a-h for connecting to the APs and through the APs, to other devices within the network configuration 100. Each of APs 106a-c may be a combination of hardware, software, and/or firmware that is configured to provide wireless network connectivity to wireless client devices 110a-h. In the illustrated example, APs 106a-c can be managed and configured by the controller 104. APs 106a-c communicate with the controller 104 and the network over connections 112, which may be either wired or wireless interfaces.

The network configuration 100 may include one or more remote sites 132. A remote site 132 may be located in a different physical or geographical location from the primary site 102. In some cases, the remote site 132 may be in the same geographical location, or possibly the same building, as the primary site 102, but lacks a direct connection to the network located within the primary site 102. Instead, remote site 132 may utilize a connection over a different network, e.g., network 120. A remote site 132 such as the one illustrated in FIG. 1 may be, for example, a satellite office, another floor or suite in a building, and so on. The remote site 132 may include a gateway device 134 for communicating with the network 120. A gateway device 134 may be a router, a digital-to-analog modem, a cable modem, a Digital Subscriber Line (DSL) modem, or some other network device configured to communicate to the network 120. The remote site 132 may also include a switch 138 and/or AP 136 in communication with the gateway device 134 over either wired or wireless connections. The switch 138 and AP 136 provide connectivity to the network for various client devices 140a-d.

In various embodiments, the remote site 132 may be in direct communication with primary site 102, such that client devices 140a-d at the remote site 132 access the network resources at the primary site 102 as if these clients devices 140a-d were located at the primary site 102. In such embodiments, the remote site 132 is managed by the controller 104 at the primary site 102, and the controller 104 provides the necessary connectivity, security, and accessibility that enable the remote site 132's communication with the primary site 102. Once connected to the primary site 102, the remote site 132 may function as a part of a private network provided by the primary site 102.

In various embodiments, the network configuration 100 may include one or more smaller remote sites 142, comprising only a gateway device 144 for communicating with the network 120 and a wireless AP 146, by which various client devices 150a-b access the network 120. Such a remote site 142 may represent, for example, an individual employee's home or a temporary remote office. The remote site 142 may also be in communication with the primary site 102, such that the client devices 150a-b at remote site 142 access network resources at the primary site 102 as if these client devices 150a-b were located at the primary site 102. The remote site 142 may be managed by the controller 104 at the primary site 102 to make this transparency possible. Once connected to the primary site 102, the remote site 142 may function as a part of a private network provided by the primary site 102.

The network 120 may be a public or private network, such as the Internet, or other communication network to allow connectivity among the various sites 102, 130 to 142 as well as access to servers 160a-b. The network 120 may include third-party telecommunication lines, such as phone lines, broadcast coaxial cable, fiber optic cables, satellite communications, cellular communications, and the like. The network 120 may include any number of intermediate network devices, such as switches, routers, gateways, servers, and/or controllers, which are not directly part of the network configuration 100 but that facilitate communication between the various parts of the network configuration 100, and between the network configuration 100 and other network-connected entities. The network 120 may include various content servers 160a-b. Content servers 160a-b may include various providers of multimedia downloadable and/or streaming content, including audio, video, graphical, and/or text content, or any combination thereof. Examples of content servers 160a-b include, for example, web servers, streaming radio and video providers, and cable and satellite television providers. The client devices 110a-j, 140a-d, 150a-b may request and access the multimedia content provided by the content servers 160a-b.

Figure 2:
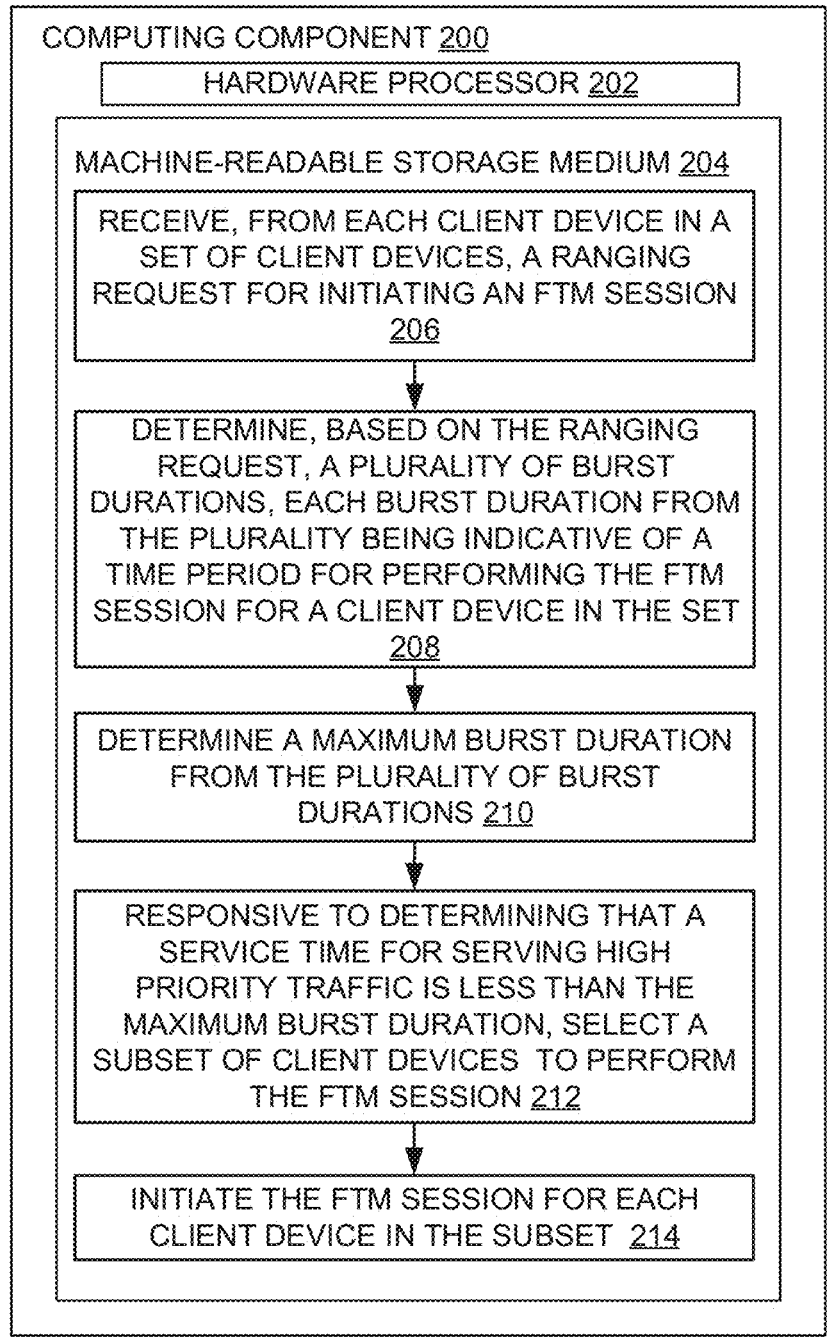
FIG. 2 is a block diagram of an example computing component or device for handling multiple FTM requests in accordance with an embodiment.

FIG. 2 is a block diagram of an example computing component or device 200 for handling multiple FTM requests, in accordance with an embodiment. In an example, the computing component 200 may function as a network device, as referred to in embodiments described herein. Examples of the network device may include APs, layer 3 switches, and routers. In another example, the computing component 200 may function as a client device, such as a computer, a smartphone, etc., connecting to the network device.

In the example implementation of FIG. 2, the computing component 200 includes a hardware processor, 202, and machine-readable storage medium, 204. Hardware processor 202 may be one or more central processing units (CPUs), semiconductor-based microprocessors, and/or other hardware devices suitable for retrieval and execution of instructions stored in machine-readable storage medium, 204. Hardware processor 202 may fetch, decode, and execute instructions, such as instructions 206-214, to control processes or operations for handling multiple ranging requests for initiating FTM. As an alternative or in addition to retrieving and executing instructions, hardware processor 202 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 204, may be any electronic, magnetic, optical, or other physical storage device that contains or stores executable instructions. Thus, machine-readable storage medium 204 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 204 may be a non-transitory storage medium, where the term "non-transitory" does not encompass transitory propagating signals. As described in detail below, machine-readable storage medium 204 may be encoded with executable instructions, for example, instructions 206-218.

Further, although the steps shown in FIG. 2 are in an order, the shown order is not the only order in which the steps may be performed. Any step may be performed in any order, at any time, may be performed repeatedly, and/or may be performed by any suitable device or devices. The process shown in FIG. 2 is also discussed in FIG. 3, at a differing level of detail.

In step 206, the computing component/device 200 receives a ranging request for initiating an FTM session from each client device in a set of client devices. The computing component/device 200 may be an AR In an example, multiple client devices in the set may attempt to establish an FTM session with the AP to determine a distance between each of the client devices and the AP by sending the ranging request. Thus, multiple ranging requests may be received, in parallel, from the multiple client devices.

In step 208, the computing device 200 may determine a plurality of burst durations, where each burst duration from the plurality is indicative of a time period for performing the FTM session for a client device in the set. The burst duration refers to a time period for executing an FTM session between the AP and a client device. There may be one or more FTM messages exchanged between the AP and the client device in the burst duration. In an example, the ranging request may include an FTM request frame containing FTM parameters to be negotiated with the AP. The FTM parameters may include, for example, a burst duration value, a number of bursts exponent value, a Minimum Delta FTM value, an As Soon As Possible (ASAP) value, FTMs per burst value, FTM frame format, etc. Based on one or more of the FTM parameters included in the ranging request, the burst duration for performing the FTM session for each client device in the set may be determined.

In the step 210, a maximum burst duration is determined from the plurality of burst durations. In an example, the maximum burst duration may be identified by comparing the burst durations of individual client devices in the set. The maximum burst duration is indicative of a maximum time that may be required to perform an FTM session between one of the set of client devices and the AP.

In the step 212, responsive to determining that a service time for serving high priority traffic is less than the maximum burst duration, a subset of the client devices is selected to perform the FTM sessions, such that a sum of burst durations for performing the FTM session for each client device in the subset is less than the maximum burst duration. In an example, the determined burst durations for each of the subset of client devices is added and the sum of burst durations is compared with the maximum burst duration. As long as the sum of burst durations does not exceed the maximum burst duration, the FTM session can be performed for each of the subset of client devices.

In an example, high priority traffic served by the AP is identified. The high priority traffic may include VoIP traffic, online gaming, media streaming services, etc. The high priority traffic may be identified based on identifiers present in the packets transmitted via the AP. The AP may classify traffic as high priority based on a number of factors including port number, protocol, byte frequencies, packet sizes. Based on the above factors, an AP may implement traffic management schemes or policies to classify the traffic and serve traffic based on its classification. In some examples, network traffic can be classified as sensitive traffic and best effort traffic. Sensitive traffic includes network traffic which has an expectation to be delivered on time. This may include VoIP, online gaming, video conferencing, and web browsing. Traffic management schemes are configured such that the quality of service (QoS) of these selected uses is guaranteed, or at least prioritized over other classes of traffic. Best effort traffic is all other kinds of non-detrimental traffic. This is traffic that the service provider deems is not sensitive to QoS parameters (such as jitter, packet loss, latency). Examples of best effort traffic may include peer-to-peer and email applications. Traffic management schemes are configured such that resources of the AP are assigned to the best-effort traffic after sensitive traffic is served in priority. Thus, the high priority traffic, in this example, may include sensitive traffic. In an example, network traffic served by the AP may be classified as high priority or best effort using service differentiation techniques. For instance, a Differentiated Services Code Point (DSCP) which is a packet header value in an IP packet can be used to request (for example) high priority or best effort delivery for network traffic. Based on the DSCP value, the network traffic can be classified as, for example, Expedited Forwarding (EF), Assured Forwarding (AF), etc. Packets with EF codepoint values may be guaranteed highest priority delivery and packets with AF codepoint may indicate a request for the traffic to receive higher priority treatment than best effort traffic (though packets with an EF codepoint may continue to take precedence over those with an AF codepoint). In an example, for the purpose of the present disclosure, packets with either EF or AF codepoint values may be determined as high priority traffic.

Responsive to identifying that that the AP is serving high priority traffic, a service time for serving the high priority traffic is compared with the maximum burst duration. In an example, the service time indicates an estimated time taken by the AP to complete serving the high priority traffic. If the service time for serving high priority traffic is less than the maximum burst duration, the subset of client devices is selected for performing FTM sessions. If the service time is equal to or more than the maximum burst duration, the ranging requests the client devices in the set are rejected.

At step 214, the FTM session is initiated for each client device in the subset. In an example, the ranging request for initiating the FTM session from each client device may be served in a First-In-First-Out (FIFO) order. In an example, the AP may acknowledge the ranging request of one client device in the selected subset in the FIFO order thereby initiating the FTM session for the client device. Thus, FTM sessions are selectively initiated for some of the client devices requesting the FTM sessions, while handling high priority traffic without performance degradation.

Figure 3A:
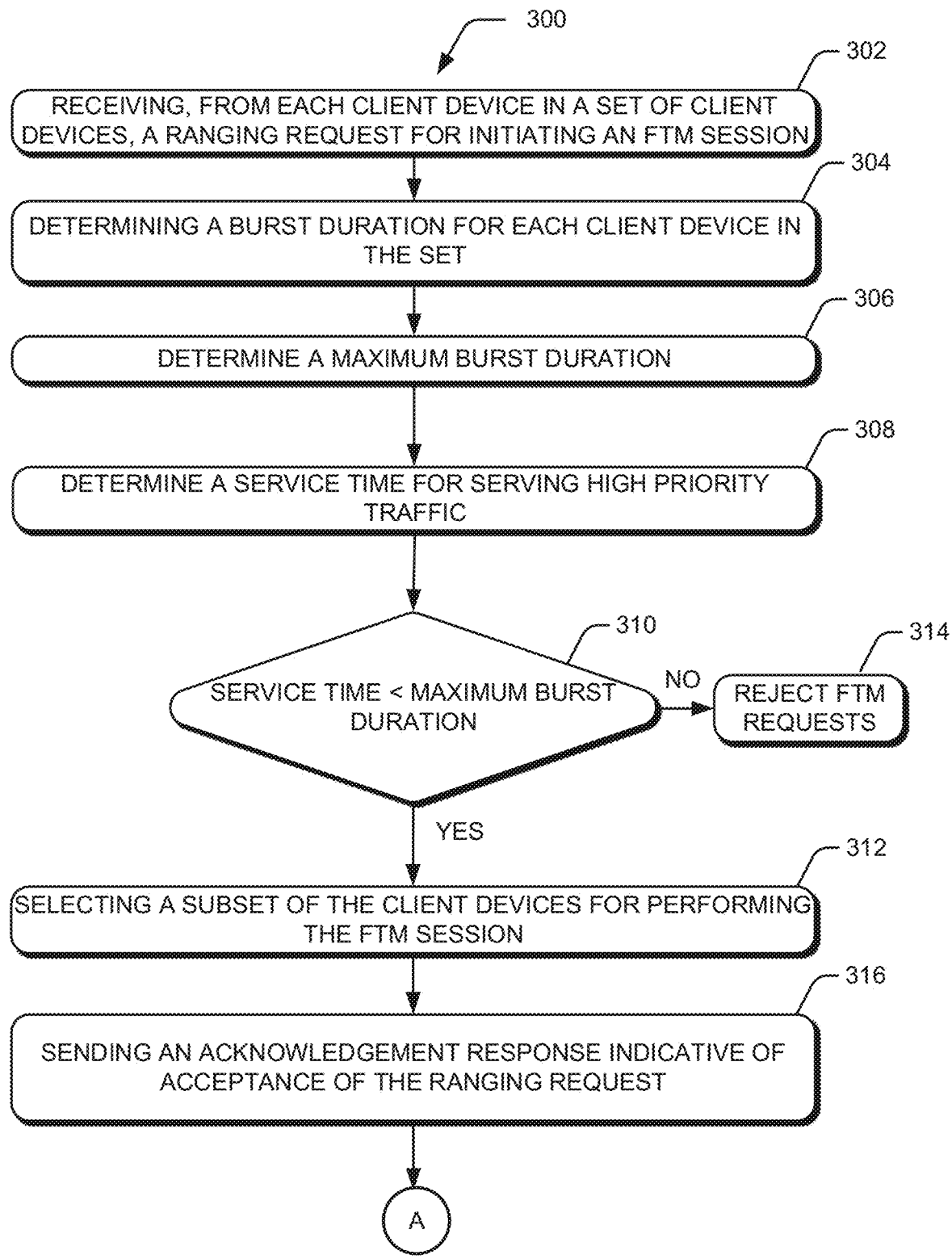
FIGS. 3A and 3B illustrates an example method for handling multiple FTM requests in accordance with an embodiment.
Figure 3B:
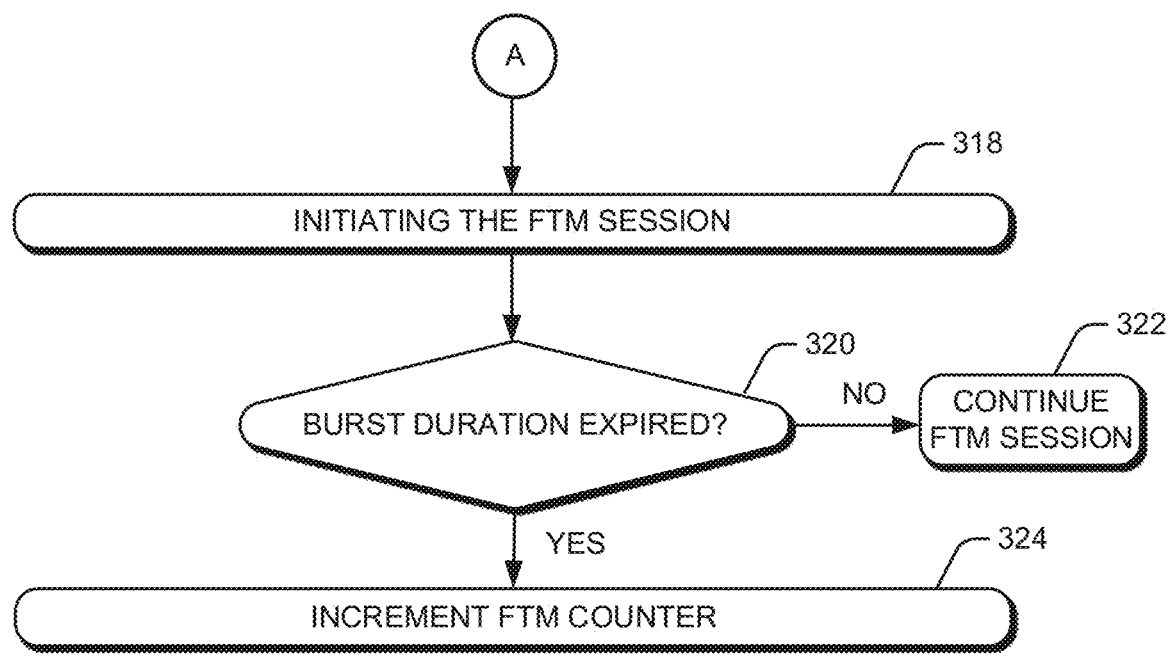

FIGS. 3A and 3B illustrate an example method 300 for handling multiple FTM ranging requests in accordance with an embodiment. The method 300 may be executed by a network device, such as an AP, switch, or router. Although in the examples described herein, it is considered that the method 300 is implemented by a network device, however, the method 300 may also be implemented by client devices, such as personal computers, laptops, smartphones, etc. The steps of the method 300 as described herein can be performed mutatis mutandis by a client device. The method 300 can be implemented by processing resource(s) or computing device(s) through any suitable hardware, a non-transitory machine readable medium, or combination thereof. In an example, the method 300 may be performed by computer-readable instructions, which include instructions stored on a medium and executable by a processing resource, such as the hardware processor 202, of a computing device/component, such as the computing component 200. Further, although the method 300 is described in context of the aforementioned computing component 200, other suitable systems may be used for execution of the method 300. It may be understood that processes involved in the method 300 can be executed based on instructions stored in a non-transitory computer-readable medium. The non-transitory computer-readable medium may include, for example, digital memories, magnetic storage media, such as a magnetic disks and magnetic tapes, hard drives, or optically readable digital data storage media.

Referring to FIG. 3A, at block 302, an AP, such as one of the APs 106a-c of FIG. 1, may receive a ranging request for initiating an FTM session from each client device in a set of client devices, such as each client device in the set client devices 110a-j of FIG. 1. In an example, each of the set of client devices 110a-j may send a ranging request to the AP 106a to measure a distance of each of the client devices from the AP 106a. In an instance, the AP 106a may initialize an FTM counter associated with each of the client devices 110a-j. Initialization of the FTM counter includes storing a value for the FTM counter in the AP 106a. The FTM counter is indicative of successfully completed FTM sessions for each client device in the set. Thus, the FTM counter is a measure of how frequently an FTM session of the client device is served by the AP 106a. In an example, the ranging request received from each client device in the set may include FTM parameters for negotiation between the AP 106a and each client device 110a-j.

At block 304, based on the ranging request, a burst duration for performing the FTM session for each client device in the set may be determined by the AP, such as the AP 106a. In an example, based on the FTM parameters negotiated between the AP and each client device 110a-j, the burst duration for performing the FTM session for each client device 110a-j may be determined. Consider that the burst duration for each of the client devices 110a-j is $D_a$-$D_j$, respectively. Thus, for client device 110a the determined burst duration is $D_a$, for client device 110b the determined burst duration is $D_b$, and so on.

At block 306, a maximum burst duration from the burst durations $D_a$-$D_j$ is determined. The maximum burst duration corresponds to the maximum time duration that may be required for performing the FTM session between one of the client devices 110a-j and the AP 106a. Consider that the maximum burst duration is determined to be $D_h$. Thus, maximum burst duration $D_{max}=D_h$.

The AP may determine a service time for serving high priority traffic, at block 308, In an example, a priority level or classification of the traffic currently served by the AP is checked. In an example, a Differential Services (DS) field in an IP packet header may be checked to determine whether the traffic is high priority. Based on the DS field value, the traffic may be identified as "high priority" or "best effort".

The service time refers to an estimated time that the AP may take to serve the high priority traffic. Consider that the service time for serving high priority traffic by the AP 106a is determined as $T_s$. At block 310, the service time is compared with the maximum burst duration. Responsive to determining that the service time is less than the maximum burst duration ("Yes" branch from block 310), i.e., $T_s < D_{max}$, a subset of the client devices is selected to perform the FTM session, at block 312, In an example, the subset of client devices 110a-e may be selected, such that a sum of burst durations for performing the FTM session for each client device in the subset is less than the maximum burst duration for performing the FTM session. Thus, in the present example, $\Sigma D_a + D_b + \ldots + D_e < D_{max}$.

In an example, selection of the subset of client devices 110a-e is based at least in part on the FTM counter associated with each client device in the set. In an example, the FTM counters associated with the client devices 110a-e may be checked before selecting them as the subset of client devices and initiation of the FTM session may be prioritized for a client device in the set having a lowest value of the FTM counter, Thus, while selecting the subset of client devices 110a-e, the client devices may be selected in an ascending order of the value of the FTM counter, with the client device having the lowest value of the FTM counter being selected first.

Responsive to determining that the service time is equal to or greater than the maximum burst duration, i.e., $T_s \geq D_{max}$, the ranging request from each client device in the set 110 a-j is rejected, at block 314. Responsive to rejecting the ranging requests from the client devices in the set, the AP 106a may assign its resources for serving the high priority traffic.

Once the subset of client devices 110a-e is selected, an acknowledgement response indicative of acceptance of the ranging request received from each client device in the subset is sent to each client device in the subset, at block 316. In an example, the acknowledgement response is sent to each of a selected client device in the subset according to a sequence in which the client devices in the subset sent the ranging requests. Considering that ranging requests were sent by the client devices 110a-e sequentially one after another starting from 110a, the acknowledgement response to each client device in the subset 110a-e is sent in the same order. Thus, the acknowledgement response is first sent to the client device 110a, consequently initiating the FTM session for the client device 110a. For instance, once the burst duration of the FTM session of the client device 110a is expired, the AP may acknowledge the ranging request from the client device 110b. In an example, the FTM sessions for the selected subset of client devices 110a-e is initiated in a first-in-first-out (FIFO) manner such that the client device in the subset that sent the first ranging request is acknowledged and served first. Thus, the FTM session for each client device in the subset is initiated based on a sequence in which the ranging request from each client device is received, at block 318. Once initiated, the FTM session may be performed for client device 110a and FTM messages may be exchanged for the burst duration of the FTM session.

At block 320, it is checked whether the burst duration $D_a$ for the client device 110a has expired. Expiry of the burst duration ("Yes" branch from block 320) indicates that the FTM session for the client device 110a is complete. If the burst duration has not expired, the FTM session may be continued, at block 322. Responsive to completion of the FTM session for client device 110a, the FTM counter associated with the client device 110a is incremented. After FTM session for client device 110a is completed, the FTM session for client device 110b is initiated based on the sequence in which ranging requests were received from the client devices in the subset. On completion of the FTM session for the client device 110b, the FTM counter associated with the client device 110b is incremented. Thus, responsive to completion of the FTM session for each client device in the subset, the FTM counter associated with each client device in the subset is incremented, at block 324. The FTM session for a client device in the set having a lowest value of the FTM counter is prioritized. In an example, if the client device having the lowest value of the FTM counter sends a ranging request to initiate an FTM session, such a client device is given priority during the step of selection of the subset of client devices.

Figure 4:
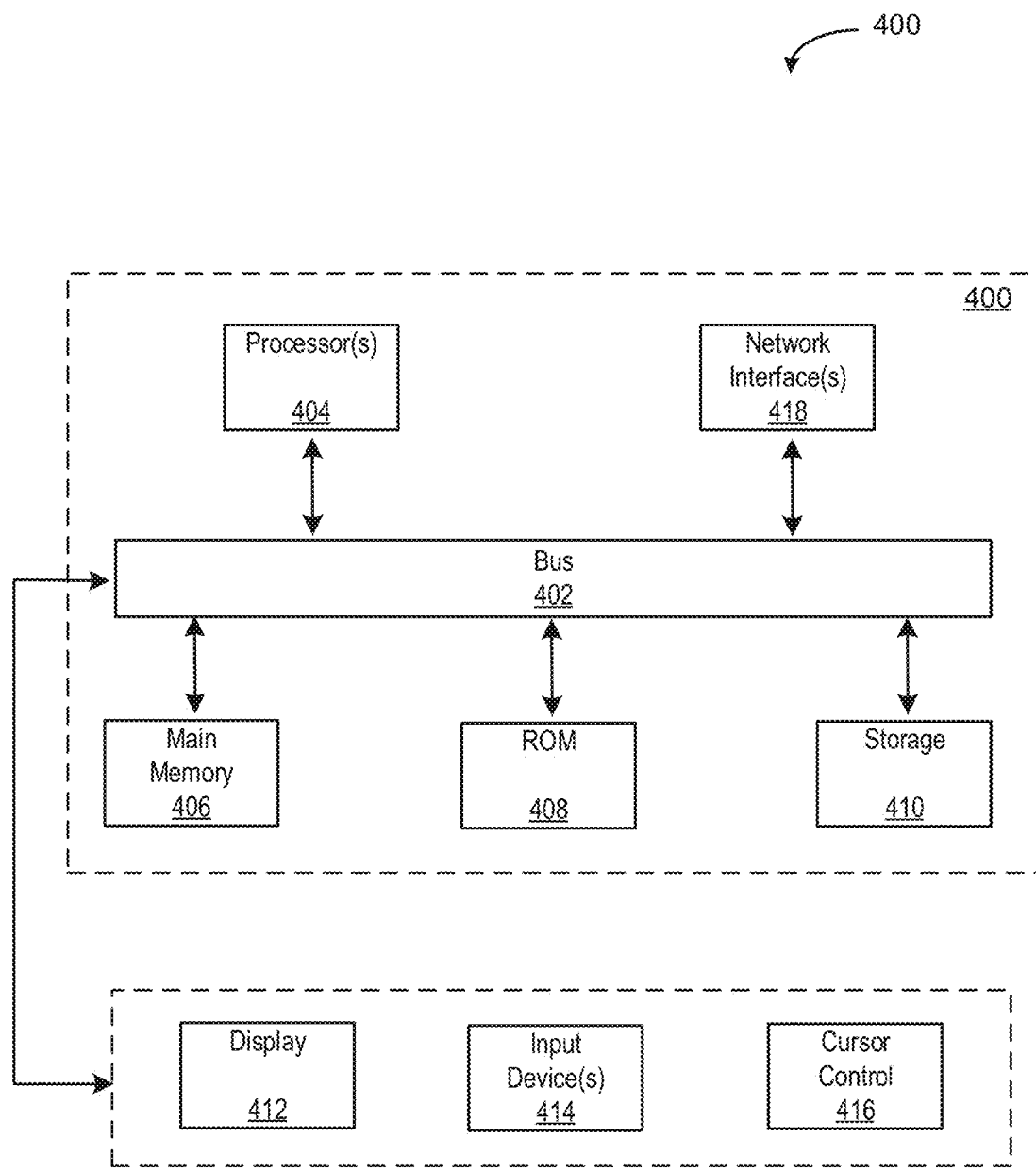
FIG. 4 depicts a block diagram of an example computer system in which the embodiments described herein may be implemented.

FIG. 4 depicts a block diagram of an example computer system 400 in which the embodiments described herein may be implemented. The computer system 400 includes a bus 402 or other communication mechanism for communicating information, one or more hardware processors 404 coupled with bus 402 for processing information. Hardware processor(s) 404 may be, for example, one or more general purpose microprocessors.

The computer system 400 also includes a main memory 406, such as a random access memory (RAM), cache and/or other dynamic storage devices, coupled to bus 402 for storing information and instructions to be executed by processor 404. Main memory 406 also may be used for storing temporary variables or other intermediate information during execution of instructions to be executed by processor 404. Such instructions, when stored in storage media accessible to processor 404, render computer system 400 into a special-purpose machine that is customized to perform the operations specified in the instructions.

The computer system 400 further includes a read only memory (ROM) 408 or other static storage device coupled to bus 402 for storing static information and instructions for processor 404. A storage device 410, such as a magnetic disk, optical disk, or USB thumb drive (Flash drive), etc., is provided and coupled to bus 402 for storing information and instructions.

The computer system 400 may be coupled via bus 402 to a display 412, such as a liquid crystal display (LCD) (or touch screen), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. In some embodiments, the same direction information and command selections as cursor control may be implemented via receiving touches on a touch screen without a cursor.

The computing system 400 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "system," "database," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor(s) 404 executing one or more sequences of one or more instructions contained in main memory 406. Such instructions may be read into main memory 406 from another storage medium, such as storage device 410. Execution of the sequences of instructions contained in main memory 406 causes processor(s) 404 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 410. Volatile media includes dynamic memory, such as main memory 406. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 402. Transmission media can also take the form of acoustic or light waves, such as those generated during radio-wave and infra-red data communications.

The computer system 400 also includes a communication interface 418 coupled to bus 402. Network interface 418 provides a two-way data communication coupling to one or more network links that are connected to one or more local networks. For example, communication interface 418 may be an integrated services digital network (ISDN) card, cable modem, satellite modem, or a modem to provide a data communication connection to a corresponding type of telephone line. As another example, network interface 418 may be a local area network (LAN) card to provide a data communication connection to a compatible LAN (or WAN component to communicated with a WAN). Wireless links may also be implemented. In any such implementation, network interface 418 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 418, which carry the digital data to and from computer system 400, are example forms of transmission media.

The computer system 400 can send messages and receive data, including program code, through the network(s), network link and communication interface 418. In the Internet example, a server might transmit a requested code for an application program through the Internet, the ISP, the local network and the communication interface 418. The received code may be executed by processor 404 as it is received, and/or stored in storage device 410, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 400.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like. The presence of broadening words and phrases such as "one or more," "at least," "but not limited to" or other like phrases in some instances shall not be read to mean that the narrower case is intended or required in instances where such broadening phrases may be absent.

Although implementations of present subject matter have been described in language specific to structural features and/or methods, it is to be noted that the present subject matter is not necessarily limited to the specific features or methods described. Rather, the specific features and methods are disclosed and explained in the context of a few implementations for the present subject matter.

We claim:

1. A method comprising:
receiving, by an access point (AP) from each client device in a set of client devices, a ranging request for initiating an FTM session;
determining, by the AP and based on the ranging request, a plurality of burst durations, each burst duration from the plurality being indicative of a time period for performing the FTM session for a client device in the set;
determining, by the AP, a maximum burst duration from the plurality of burst durations;
responsive to determining that a service time for serving high priority traffic is less than the maximum burst duration, selecting, by the AP, a subset of the client devices to perform the FTM session, wherein a sum of burst durations for performing the FTM session for each client device in the subset is less than the maximum burst duration; and
initiating, by the AP, the FTM session for each client device in the subset.

2. The method of claim 1, wherein the FTM session for each client device in the subset is initiated based at least in part on a sequence in which the ranging request from each client device is received.

3. The method of claim 1, wherein the selection of the subset of client devices is based at least in part on an FTM counter associated with each client device in the set, wherein the FTM counter is indicative of successfully completed FTM sessions for each client device in the set.

4. The method of claim 3, comprising:
responsive to completion of the FTM session for each client device in the subset, incrementing the FTM counter associated with each client device in the subset.

5. The method of claim 3, comprising:
responsive to expiration of the maximum burst duration, prioritizing initiation of the FTM session for a client device in the set having a lowest value of the FTM counter.

6. The method of claim 1, comprising, responsive to determining that the service time is greater than the maximum burst duration; rejecting the ranging request from each client device in the set.

7. The method of claim 1, wherein the high priority traffic is identified based on at least one of port number, protocol, byte frequencies; packet sizes, and differentiated services code point (DSCP) in an Internet Protocol (IP) packet header.

8. An access point (AP) comprising:
a processor; and
a memory coupled to the processor, the memory storing instructions executable by the processor to:
receive, from each client device in a set of client devices, a ranging request for initiating an FTM session;
determine; based on the ranging request, a plurality of burst durations, each burst duration from the plurality is indicative of a time period for performing the FTM session for a client device in the set;
determine a maximum burst duration from the plurality of burst durations;
responsive to determining that a service time for serving high priority traffic is less than the maximum burst duration, select a subset of the client devices to perform the FTM session, wherein a sum of burst durations for performing the FTM session for each client device in the subset is less than the maximum burst duration; and
initiate the FTM session for each client device in the subset.

9. The AP of claim 8, wherein the FTM session for each client device in the subset is initiated based at least in part on a sequence in which the ranging request from each client device is received.

10. The AP of claim 8, wherein the selection of the subset of client devices is based at least in part on an FTM counter associated with each client device in the set; wherein the FTM counter is indicative of successfully completed FTM sessions for each client device in the set.

11. The AP of claim 10, wherein the processor is further to:
increment the FTM counter associated with each client device in the subset, responsive to completion of the FTM session for each client device in the subset.

12. The AP of claim 10, wherein the processor is further to:
prioritize initiation of the FTM session for a client device in the set having a lowest value of the FTM counter, responsive to expiration of the maximum burst duration.

13. The AP of claim 8, wherein the processor is further to:
reject the ranging request from each client device in the set, responsive to determining that the service time is greater than the maximum burst duration.

14. The AP of claim 8, wherein the high priority traffic is identified based on at least one of port number, protocol, byte frequencies, packet sizes, and differentiated services code point (DSCP) in an Internet Protocol (IP) packet header.

15. A non-transitory computer-readable medium comprising computer-readable instructions, the computer-readable instructions when executed by a processor, cause the processor to:
receive, from each client device in a set of client devices, a ranging request for initiating an FTM session;
determine, based on the ranging request, a plurality of burst durations, each burst duration from the plurality is indicative of a time period for performing the FTM session for each client device in the set;
determine a maximum burst duration from the plurality of burst durations;
responsive to determining that a service time for serving high priority traffic is less than the maximum burst duration, select a subset of the client devices to perform the FTM session, wherein a sum of burst durations for performing the FTM session for each client device in the subset is less than the maximum burst duration; and
initiate the FTM session for each client device in the subset.

16. The non-transitory computer-readable medium of claim 15, wherein the FTM session for each client device in the subset is initiated based at least in part on a sequence in which the ranging request from each client device is received.

17. The non-transitory computer-readable medium of claim 15, wherein the selection of the subset of client devices is based at least in part on an FTM counter associated with each client device in the set, wherein the FTM counter is indicative of successfully completed FTM sessions for each client device in the set.

18. The non-transitory computer-readable medium of claim 17, wherein the computer-readable instructions, further cause the processor to;
increment the FTM counter associated with each client device in the subset, responsive to completion of the FTM session for each client device in the subset.

19. The non-transitory computer-readable medium of claim 17, wherein the computer-readable instructions further cause the processor to:
prioritize initiation of the FTM session for a client device in the set having a lowest value of the FTM counter, responsive to expiration of the maximum burst duration.

20. The non-transitory computer-readable medium of claim 15, wherein the computer-readable instructions further cause the processor to:
reject the ranging request from each client device in the set, responsive to determining that the service time is greater than the maximum burst duration.

* * * * *